US012405554B2

(12) United States Patent
Shimizu et al.

(10) Patent No.: US 12,405,554 B2
(45) Date of Patent: Sep. 2, 2025

(54) DEVELOPING DEVICE AND IMAGE FORMING APPARATUS

(71) Applicant: KYOCERA Document Solutions Inc., Osaka (JP)

(72) Inventors: Tamotsu Shimizu, Osaka (JP); Kenichi Tamaki, Osaka (JP); Hiroshi Yamazaki, Osaka (JP); Junichi Nakagawa, Osaka (JP); Takuji Watanabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 29 days.

(21) Appl. No.: 18/517,655

(22) Filed: Nov. 22, 2023

(65) Prior Publication Data

US 2024/0176262 A1 May 30, 2024

(30) Foreign Application Priority Data

Nov. 30, 2022 (JP) ................................ 2022-191115

(51) Int. Cl.
*G03G 15/08* (2006.01)

(52) U.S. Cl.
CPC ..... *G03G 15/0898* (2013.01); *G03G 15/0891* (2013.01); *G03G 2215/085* (2013.01)

(58) Field of Classification Search
None
See application file for complete search history.

(56) References Cited

U.S. PATENT DOCUMENTS

| | | | | |
|---|---|---|---|---|
| 2012/0189352 A1* | 7/2012 | Yamauchi | G03G 15/0893 | 399/258 |
| 2013/0343784 A1* | 12/2013 | Fujimura | G03G 15/0889 | 399/272 |
| 2014/0153957 A1* | 6/2014 | Yonemoto | G03G 15/161 | 399/101 |
| 2014/0270838 A1* | 9/2014 | Yoshizawa | G03G 15/0893 | 399/99 |
| 2014/0294429 A1 | 10/2014 | Inui et al. | | 399/99 |
| 2015/0023686 A1* | 1/2015 | Mukataka | G03G 21/206 | 399/99 |
| 2018/0120731 A1* | 5/2018 | Nakamura | G03G 15/0881 | |
| 2018/0129150 A1* | 5/2018 | Taniguchi | G03G 15/0891 | |

(Continued)

FOREIGN PATENT DOCUMENTS

JP 2014-191342 A 10/2014

*Primary Examiner* — Sevan A Aydin
(74) *Attorney, Agent, or Firm* — Stein IP LLC

(57) ABSTRACT

The developing device includes a development container, a developer carrier, and a toner trapping mechanism. The development container includes a first conveyance chamber and a second conveyance chamber placed in parallel juxtaposition and communicated with each other at their longitudinal both end portions, and the development container contains a toner-containing developer to be fed to an image carrier. The toner trapping mechanism includes a duct, an air inlet port, a trapping filter, and a fan. The duct is connected to the second conveyance chamber, and allows air present in the second conveyance chamber to flow therethrough. The development container has an air vent opened in the first conveyance chamber and communicated with outside of the development container.

8 Claims, 9 Drawing Sheets

(56) References Cited

U.S. PATENT DOCUMENTS

| | | | | |
|---|---|---|---|---|
| 2018/0314185 | A1* | 11/2018 | Yin | G03G 21/1885 |
| 2021/0055674 | A1* | 2/2021 | Wada | G03G 15/0889 |
| 2021/0072663 | A1* | 3/2021 | Kato | G03G 15/0815 |
| 2022/0197186 | A1* | 6/2022 | Harada | G03G 21/1832 |
| 2023/0408974 | A1* | 12/2023 | Watanabe | G03G 21/206 |
| 2023/0408975 | A1* | 12/2023 | Yamazaki | G03G 15/0887 |
| 2023/0408976 | A1* | 12/2023 | Tamaki | G03G 21/206 |
| 2024/0176270 | A1* | 5/2024 | Shimizu | G03G 21/206 |
| 2024/0176271 | A1* | 5/2024 | Shimizu | G03G 21/206 |
| 2024/0176289 | A1* | 5/2024 | Tamaki | G03G 15/0921 |

* cited by examiner

DEVELOPING DEVICE AND IMAGE FORMING APPARATUS

INCORPORATION BY REFERENCE

This application is based on and claims the benefit of priority from Japanese Patent Application No. 2022-191115 filed on Nov. 30, 2022, the contents of which are hereby incorporated by reference.

BACKGROUND

The present disclosure relates to a developing device and an image forming apparatus.

In an image forming apparatus of electrophotographic system such as copiers and printers, there has been widely used a device for forming a toner image, which is to be transferred onto a paper sheet in later process, by feeding toner and executing development for an electrostatic latent image formed on an outer circumferential surface of a photosensitive drum or other image carrier. In order to enable continuous formation of uniform images, the image forming apparatus conveys toner-containing developer contained in a development container while stirring the developer in the development container.

With conventional image forming apparatuses, there has been a fear that toner may scatter from inside to outside of the development container, causing apparatus inside to be contaminated with the scattered toner.

SUMMARY

A developing device according to one aspect of the present disclosure comprises a development container, a first conveyance member and a second conveyance member, a developer carrier, and a toner trapping mechanism. The development container includes a first conveyance chamber and a second conveyance chamber placed in parallel juxtaposition and communicated with each other at their longitudinal both end portions, and the development container contains a toner-containing developer to be fed to an image carrier. The first conveyance member and the second conveyance member are rotatably supported by the first conveyance chamber and the second conveyance chamber, respectively, and convey and circulate the developer, while stirring the developer, in mutually opposite directions of the longitudinal direction. The developer carrier is rotatably supported by the development container in opposition to the image carrier, and feeds the toner contained in the second conveyance chamber to the image carrier. The toner trapping mechanism traps the toner contained in the second conveyance chamber. The toner trapping mechanism includes a duct, an air inlet port, a trapping filter, and a fan. The duct is connected to the second conveyance chamber and allows air present in the second conveyance chamber to flow therethrough. The air inlet port is opened at a connecting portion between the duct and the second conveyance chamber so as to allow air present in the second conveyance chamber to flow into the duct. The trapping filter traps the toner contained in air flowing through the duct. The fan allows air present in the second conveyance chamber to be sucked into the duct and let to flow outside. The development container has an air vent which is opened in the first conveyance chamber and communicated with outside of the development container.

DETAILED DESCRIPTION

Hereinbelow, an embodiment of the present disclosure will be described with reference to the accompanying drawings. It is to be noted that the present disclosure is not limited to the following contents.

Figure 1:
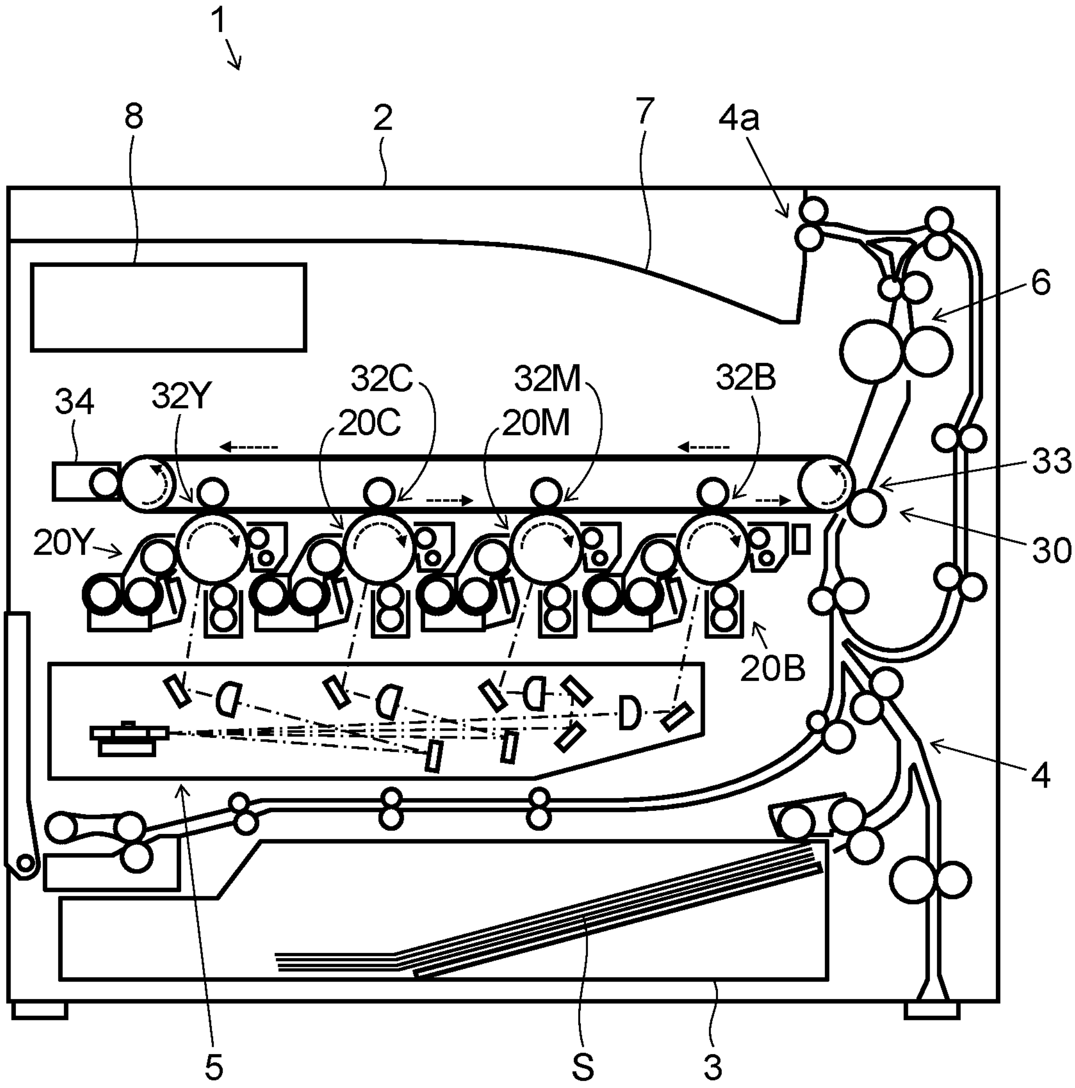
FIG. 1 is a schematic cross-sectional front view of an image forming apparatus according to one embodiment of the present disclosure.
Figure 2:
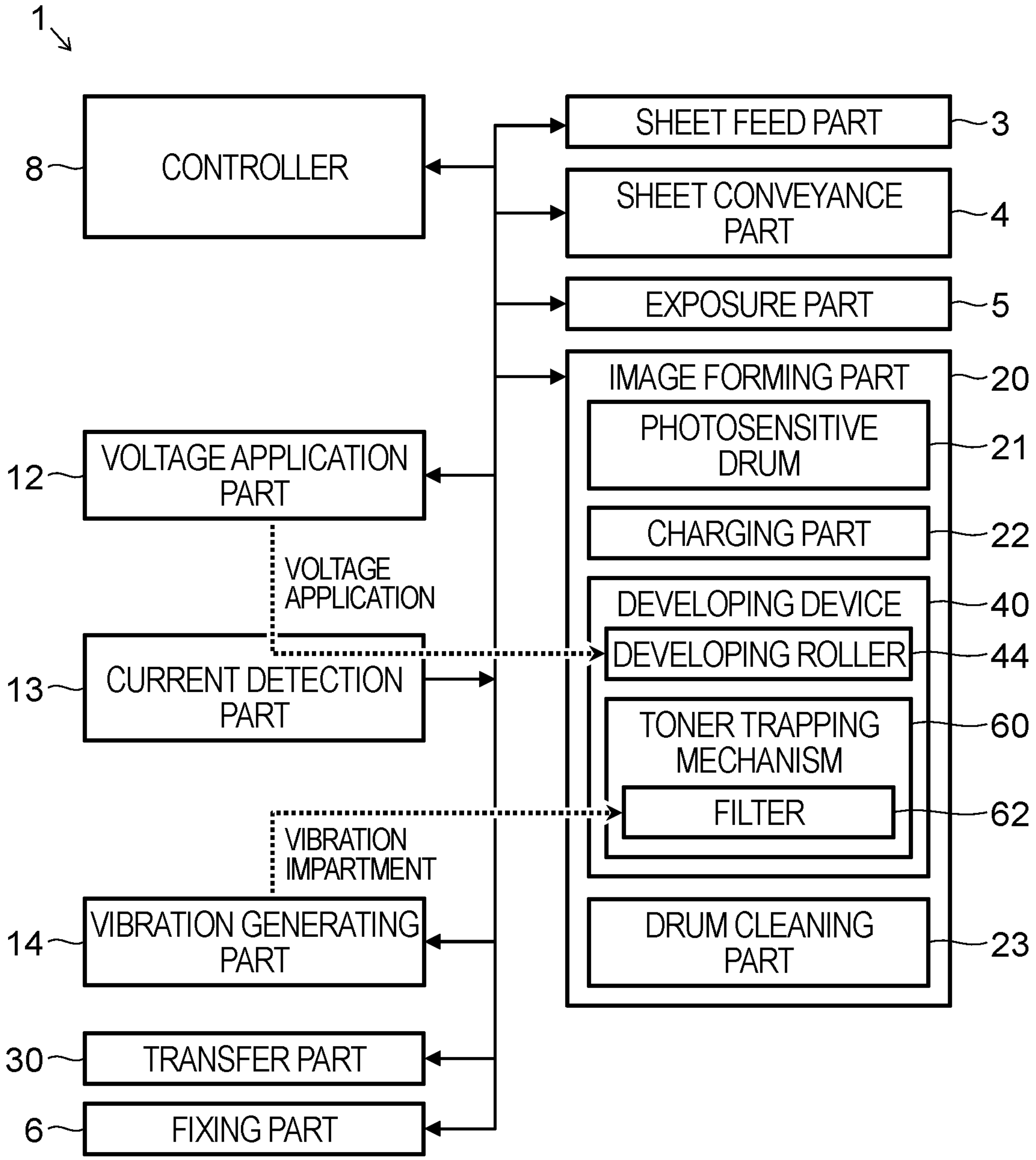
FIG. 2 is a block diagram showing a configuration of the image forming apparatus of FIG. 1.
Figure 3:
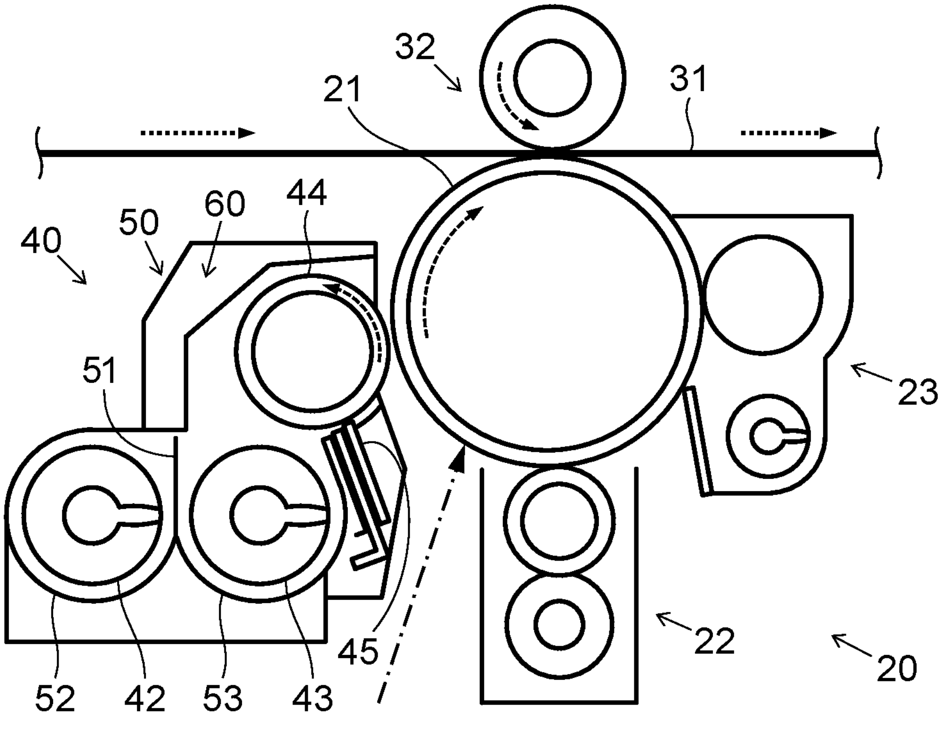
FIG. 3 is a schematic cross-sectional front view of around an image forming part in the image forming apparatus of FIG. 1.

FIG. 1 is a schematic cross-sectional front view of an image forming apparatus 1 according to this embodiment. FIG. 2 is a block diagram showing a configuration of the image forming apparatus 1 of FIG. 1. FIG. 3 is a schematic cross-sectional front view of around an image forming part 20 in the image forming apparatus 1 of FIG. 1. An example of the image forming apparatus 1 of the embodiment is a tandem-type color printer in which a toner image is transferred onto a paper sheet S by using an intermediate transfer belt 31. The image forming apparatus 1 may also be a so-called multifunction peripheral equipped with such functions as printing, scanning (image reading), and facsimile transmission.

As shown in FIGS. 1, 2 and 3, the image forming apparatus 1 includes a sheet feed part 3, a sheet conveyance part 4, an exposure part 5, image forming parts 20, a transfer part 30, a fixing part 6, a sheet discharge part 7, and a controller 8, as these are provided in an apparatus housing 2.

The sheet feed part 3 is placed at a bottom portion of the housing 2. The sheet feed part 3, containing a plurality of unprinted paper sheets S, separates a sheet S therefrom and feeds out the sheet S one by one on occasions of printing. The sheet conveyance part 4 extends in an up/down direction along a side wall of the housing 2. The sheet conveyance part 4 conveys the sheet S, which has been fed out from the sheet feed part 3, to a secondary transfer part 33 and the fixing part 6, and further discharges the after-fixation sheet S through a sheet discharge port **4*a* to the sheet discharge part 7. The exposure part 5 is placed above the sheet feed part 3. The exposure part 5 applies laser light, which has been controlled based on image data, toward the image forming parts 20**.

The image forming parts 20 are placed above the exposure part 5 and below the intermediate transfer belt 31. The image forming parts 20 include a yellow-destined image forming part 20Y, a cyan-destined image forming part 20C, a magenta-destined image forming part 20M, and a black-destined image forming part 20B. These four image forming parts 20 are identical in basic configuration. Therefore, hereinafter, unless otherwise necessarily particularly limited, the identification signs 'Y', 'C', 'M' and 'B' representing individual colors, respectively, may be omitted from time to time.

Each image forming part 20 includes a photosensitive drum (image carrier) 21 which is supported rotatable in a specified direction (clockwise in FIGS. 1 and 3). The image forming part 20 further includes a charging part 22, a developing device 40, and a drum cleaning part (cleaning part) 23, as these are disposed around the photosensitive drum 21 along its rotational direction. In addition, a primary transfer part 32 is placed between the developing device 40 and the drum cleaning part 23.

The photosensitive drum 21, which is formed into a horizontally-extending cylindrical shape, has, on its outer circumferential surface, a photosensitive layer formed from amorphous silicon photoconductor, as an example. The charging part 22 electrically charges the surface (outer circumferential surface) of the photosensitive drum 21 to a specified potential. The exposure part 5 illuminates the outer circumferential surface of the photosensitive drum 21 charged by the charging part 22 so that an electrostatic latent image of an original image is formed on the outer circumferential surface of the photosensitive drum 21. The developing device 40 feeds toner to the electrostatic latent image and makes development to form a toner image. The four image forming parts 20 form toner images of different colors, respectively. After a toner image is primarily transferred onto an outer circumferential surface of the intermediate transfer belt 31, the drum cleaning part 23 removes toner and the like remaining on the outer circumferential surface of the photosensitive drum 21, thus fulfilling cleaning function. In this way, the image forming part 20 forms an image (toner image) that is to be transferred onto the sheet S in later process.

The transfer part 30 includes the intermediate transfer belt 31, primary transfer parts 32Y, 32C, 32M, 32B, a secondary transfer part 33, and a belt cleaning part 34. The intermediate transfer belt 31 is placed above the four image forming parts 20. The intermediate transfer belt 31 is an endless intermediate transferer which is supported so as to be turnable in a specified direction (counterclockwise in FIG. 1) and to which toner images formed by the four image forming parts 20, respectively, are primarily transferred in superimposition one after another. The four image forming parts 20 are placed in such a so-called tandem mode as to be arrayed in one line from upstream side toward downstream side of the turning direction of the intermediate transfer belt 31.

The primary transfer parts 32Y, 32C, 32M, 32B are placed upward of the individual-color image forming parts 20Y, 20C, 20M, 20B, respectively, with the intermediate transfer belt 31 pinched therebetween. The secondary transfer part 33 is placed upstream of the fixing part 6 as viewed in a sheet conveyance direction of the sheet conveyance part 4, as well as downstream of the four image forming parts 20Y, 20C, 20M, 20B as viewed in the turning direction of the intermediate transfer belt 31. The belt cleaning part 34 is placed downstream of the secondary transfer part 33 as viewed in the turning direction of the intermediate transfer belt 31.

The primary transfer part 32 transfers toner images, which have been formed on the outer circumferential surfaces of the photosensitive drums 21, onto the intermediate transfer belt 31. In other words, the toner images are primarily transferred onto the outer circumferential surface of the intermediate transfer belt 31 at the individual-color primary transfer parts 32Y, 32C, 32M, 32B, respectively. Thus, by the toner images of the four image forming parts 20 being transferred successively in superimposition at specified timings along with the turning of the intermediate transfer belt 31, a color toner image in which four-color toner images of yellow, cyan, magenta and black have been superimposed together is formed on the outer circumferential surface of the intermediate transfer belt 31.

The color toner image on the outer circumferential surface of the intermediate transfer belt 31 is transferred onto the sheet S fed in synchronization by the sheet conveyance part 4 at a secondary transfer nip portion formed in the secondary transfer part 33. The belt cleaning part 34 removes toner and other deposits remaining on the outer circumferential surface of the intermediate transfer belt 31 after secondary transfer, fulfilling the cleaning function. In this way, the transfer part 30 transfers (records) the toner image, which has been formed on the outer circumferential surface of the photosensitive drum 21, onto the sheet S.

The fixing part 6 is placed upward of the secondary transfer part 33. The fixing part 6 heats and pressurizes the sheet S, onto which the toner image has been transferred, so as to fix the toner image on the sheet S.

The sheet discharge part 7 is placed above the transfer part 30. The sheet S, on which the toner image has been fixed and for which printing is over, is conveyed to the sheet discharge part 7. The sheet discharge part 7 allows an after-printing sheet (printed matter) to be taken out from upward.

The controller 8 includes a CPU, an image processing part, a storage part, and other electronic circuits and electronic components (none shown). The CPU, based on control programs and data stored in the storage part, controls operations of the individual component elements provided in the image forming apparatus 1 to execute processing related to functions of the image forming apparatus 1. The sheet feed part 3, the sheet conveyance part 4, the exposure part 5, the image forming parts 20, the transfer part 30 and the fixing part 6 receive instructions individually from the controller 8 to fulfill printing on the sheet S in linkage with one another. The storage part is made up by a combination of nonvolatile storage device such as program ROM (Read Only Memory), data ROM, or the like and volatile storage device such as RAM (Random Access Memory).

Also, the image forming apparatus 1, as shown in FIG. 2, further includes a voltage application part 12 and a current detection part 13.

The voltage application part 12 includes a power supply part and a control circuit, as an example (neither shown). The voltage application part 12 is electrically connected to a later-described developing roller (developer carrier) 44 of the developing device 40. The voltage application part 12 applies a developing voltage (developing bias) to the developing roller 44. Via the voltage application part 12, the controller 8 controls application timing, voltage value, polarity, application time or the like of the developing voltage applied to the developing roller 44.

Under application of the developing voltage to the developing roller 44, the current detection part 13 detects an electric current flowing between the photosensitive drum 21 and the developing roller 44. From the current detection part 13, the controller 8 receives information as to the current detected by the current detection part 13.

Figure 4:
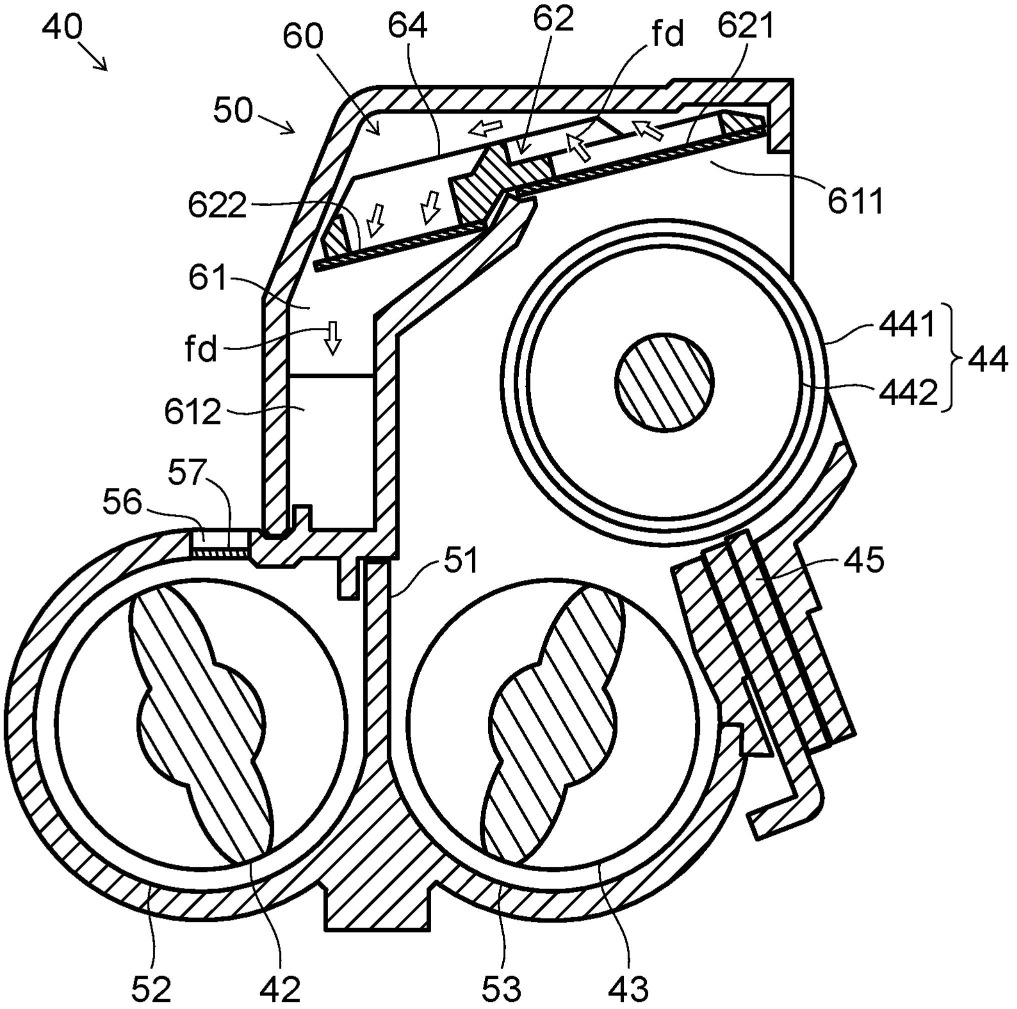
FIG. 4 is a vertical cross-sectional front view of a developing device in the image forming part of FIG. 3.
Figure 5:
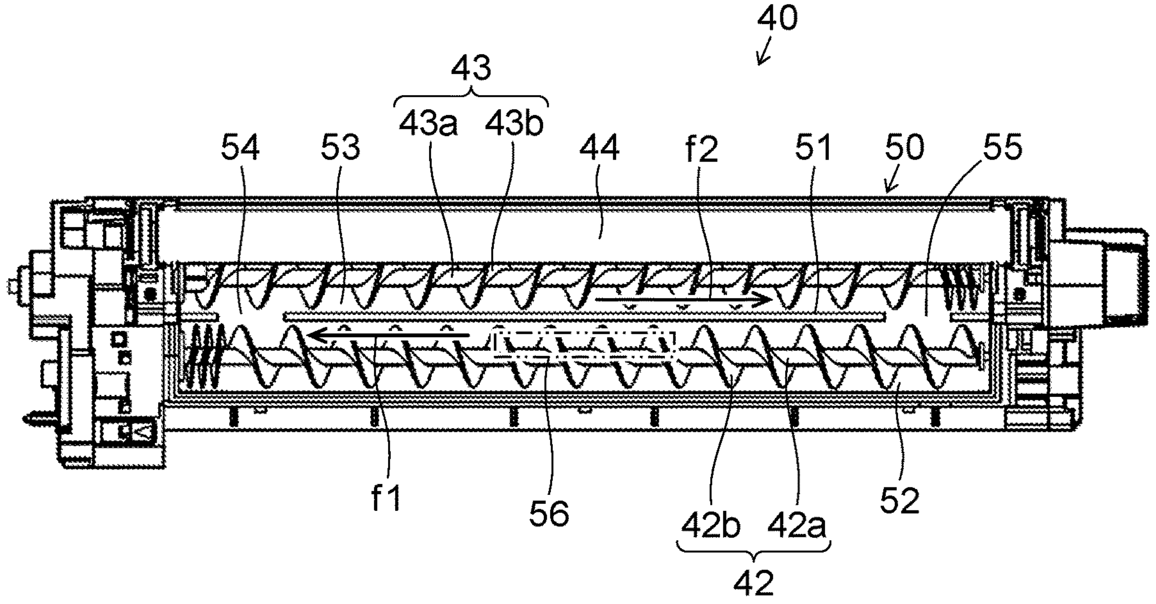
FIG. 5 is a horizontal cross-sectional plan view of the developing device in the image forming part of FIG. 3.
Figure 6:
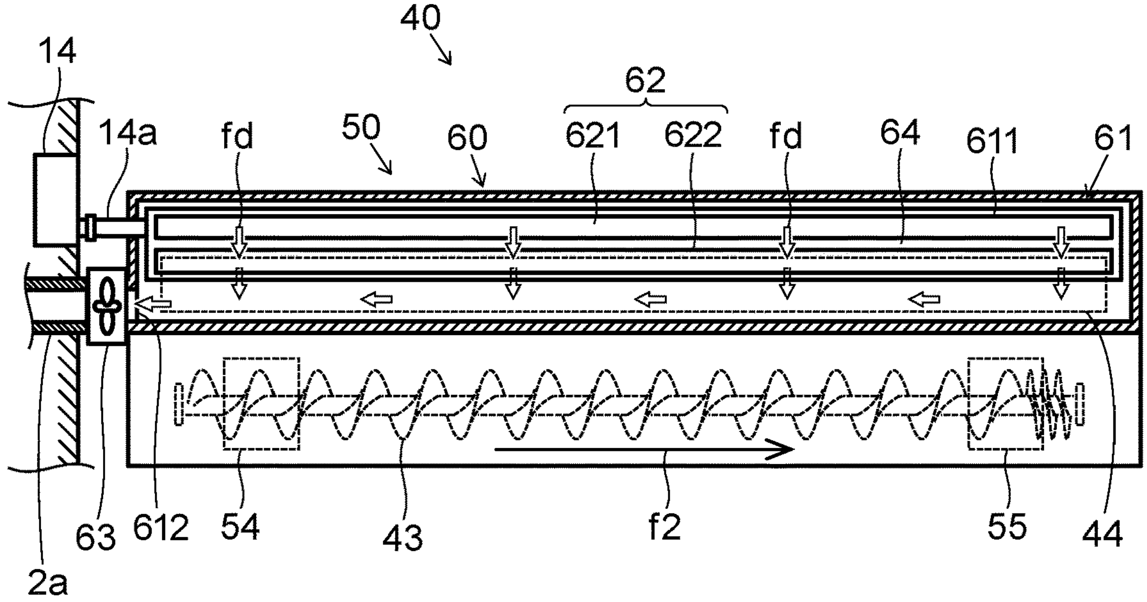
FIG. 6 is a vertical cross-sectional side view of the developing device in the image forming part of FIG. 3.

Next, a configuration of the developing device 40 will be described with reference to FIGS. 4, 5 and 6 in addition to FIGS. 2 and 3. FIGS. 4, 5 and 6 are a vertical cross-sectional front view, a horizontal cross-sectional plan view, and a vertical cross-sectional side view of the developing device 40 in the image forming part 20 of FIG. 3. In addition, the individual-color developing devices 40 are identical in basic configuration and, therefore, expression and explanation of identification signs representing the individual colors with respect to the component elements are omitted. Also, in the following description, the terms 'axial direction' refers to an axial direction (drawing-sheet depthwise direction in FIGS. 3 and 4, left/right lateral direction in FIGS. 5 and 6) of each rotation of the photosensitive drum 21, a first conveyance member 42, a second conveyance member 43 and the developing roller 44, all of which extend parallel to one another.

The developing device 40 feeds toner to the outer circumferential surface of the photosensitive drum 21. The developing device 40 is settable to and removable from the housing 2 of the image forming apparatus 1, as an example. The developing device 40 includes a development container 50, a first conveyance member 42, a second conveyance member 43, a developing roller (developer carrier) 44, and a restricting blade 45.

The development container 50, having a slender shape extending along the axial direction of the photosensitive drum 21, is placed with its longitudinal direction positioned horizontal. That is, the longitudinal direction of the development container 50 is parallel to the axial direction of the photosensitive drum 21. The development container 50 contains, for example, a two-component developer containing toner and magnetic carrier as the toner-containing developer to be fed to the photosensitive drum 21.

The development container 50 includes a partitioning portion 51, a first conveyance chamber 52, a second conveyance chamber 53, a first communicating portion 54, and a second communicating portion 55.

The partitioning portion 51 is provided in lower part inside the development container 50. The partitioning portion 51 is placed at a generally central portion in a direction intersecting the longitudinal direction of the development container 50 (left/right lateral direction in FIG. 4, up/down direction in FIG. 5). The partitioning portion 51 is formed into a generally plate shape extending in the longitudinal direction of the development container 50 as well as in the up/down direction. The partitioning portion 51 partitions interior of the development container 50 in a direction intersecting the longitudinal direction.

The first conveyance chamber 52 and the second conveyance chamber 53 are provided inside the development container 50. The first conveyance chamber 52 and the second conveyance chamber 53 are formed by the interior of the development container 50 being partitioned by the partitioning portion 51. The first conveyance chamber 52 and the second conveyance chamber 53 are juxtaposed generally equal in height to each other.

The second conveyance chamber 53, including a vicinity of a placement area of the developing roller 44 inside the development container 50, is placed in adjacency to the photosensitive drum 21. The first conveyance chamber 52 is placed in a region in the development container 50 isolated from the photosensitive drum 21 more than the second conveyance chamber 53. The first conveyance chamber 52, to which a developer supply pipe (not shown) is connected, is fed with the developer via the developer supply pipe. In the first conveyance chamber 52, the developer is conveyed in a first direction f1 by the first conveyance member 42. In the second conveyance chamber 53, the developer is conveyed by the second conveyance member 43 in a second direction f2 opposite to the first direction f1.

The first communicating portion 54 and the second communicating portion 55 are placed outside both end portions, respectively, of the partitioning portion 51 in its longitudinal direction. The first communicating portion 54 and the second communicating portion 55 allow the first conveyance chamber 52 and the second conveyance chamber 53 to be communicated with each other in a direction intersecting the longitudinal direction of the partitioning portion 51 (left/right lateral direction in FIG. 4, up/down direction in FIG. 5), i.e., in a thicknesswise direction of the generally plate-shaped partitioning portion 51. In other words, the first communicating portion 54 and the second communicating portion 55 allow the first conveyance chamber 52 and the second conveyance chamber 53 to be communicated with each other at their longitudinal-direction both end-side portions.

The first communicating portion 54 allows a first-direction-f1 downstream end of the first conveyance chamber 52 and a second-direction-f2 upstream end of the second conveyance chamber 53 to be communicated with each other. In the first communicating portion 54, the developer is conveyed from the first conveyance chamber 52 side toward the second conveyance chamber 53 side. The second communicating portion 55 allows a second-direction-f2 downstream end of the second conveyance chamber 53 and a first-direction-f1 upstream end of the first conveyance chamber 52 to be communicated with each other. In the second communicating portion 55, the developer is conveyed from the second conveyance chamber 53 side toward the first conveyance chamber 52 side.

The first conveyance member 42 is placed inside the first conveyance chamber 52. The second conveyance member 43 is placed inside the second conveyance chamber 53. The first conveyance member 42 and the second conveyance member 43 are juxtaposed generally equal in height to each other. The second conveyance member 43 extends in proximity and parallel to the developing roller 44. The first conveyance member 42 and the second conveyance member 43 are supported by the development container 50 so as to be rotatable about an axis extending horizontally in parallel to the developing roller 44.

The first conveyance member 42 and the second conveyance member 43 are identical in basic configuration to each other. The first conveyance member 42 has helical-shaped first conveyance vanes **42*b* at an outer circumferential portion of a rotating shaft 42*a* extending along the longitudinal direction of the development container 50. The second conveyance member 43 has helical-shaped second conveyance vanes 43*b* at an outer circumferential portion of a rotating shaft 43*a* extending along the longitudinal direction of the development container 50**.

Within the first conveyance chamber 52, the first conveyance member 42, while stirring the developer, conveys the developer in the first direction f1 directed from the second communicating portion 55 side toward the first communicating portion 54 side along the rotational axial direction. Within the second conveyance chamber 53, the second conveyance member 43, while stirring the developer, conveys the developer in the second direction f2 from the first communicating portion 54 side toward the second communicating portion 55 side along the rotational axial direction. That is, the first conveyance member 42 and the second conveyance member 43, while stirring, conveys the developer in mutually opposite directions of the longitudinal direction, thus circulating the developer in a specified circulative direction.

The developing roller 44 is positioned above the second conveyance member 43 inside the development container 50 and also placed in opposition to the photosensitive drum 21. The developing roller 44 is supported by the development container 50 so as to be rotatable about an axis extending parallel to the axis of the photosensitive drum 21. The developing roller 44 has a cylindrical-shaped developing sleeve 441 that rotates counterclockwise during image formation, for example as in FIGS. 3 and 4, and a stationary magnet 442 unrotatably fixed within the developing sleeve (see FIG. 4).

The developing roller 44 has its outer circumferential surface partly exposed from the development container 50 and is set into proximate opposition to the photosensitive drum 21. The developing roller 44 carries toner on part of its outer circumferential surface, where the toner is to be fed to the outer circumferential surface of the photosensitive drum 21, in a region opposed to the photosensitive drum 21. The developing roller 44 carries toner within the second conveyance chamber 53 of the development container 50, and feeds the toner to the photosensitive drum 21. In other words, the developing roller 44 makes toner in the second conveyance chamber 53 deposited to an electrostatic latent image on the outer circumferential surface of the photosensitive drum 21, thus forming a toner image.

The restricting blade 45 is placed upstream of an oppositional region between the developing roller 44 and the photosensitive drum 21 as viewed in a rotational direction of the developing roller 44. The restricting blade 45 is placed in proximate opposition to the developing roller 44 with a specified clearance provided between a forward end of the restricting blade 45 and the outer circumferential surface of the developing roller 44. The restricting blade 45 extends over an entire axial length of the developing roller 44. The restricting blade 45 restricts a layer thickness of the developer carried by the outer circumferential surface of the developing roller 44 that passes through the clearance between the forward end of the restricting blade 45 and the outer circumferential surface of the developing roller 44.

Along with rotations of the first conveyance member 42 and the second conveyance member 43, developer in the development container 50 circulates in a specified circulating direction between the first conveyance chamber 52 and the second conveyance chamber 53 via the first communicating portion 54 and the second communicating portion 55. In this case, the toner in the development container 50 is stirred and electrically charged so as to be carried on the outer circumferential surface of the developing roller 44. The developer carried on the outer circumferential surface of the developing roller 44, after restricted in its layer thickness by the restricting blade 45, is conveyed to the oppositional region between the developing roller 44 and the photosensitive drum 21 by the rotation of the developing roller 44. When a specified developing voltage is applied to the developing roller 44, toner in the developer carried on the outer circumferential surface of the developing roller 44 is moved to the outer circumferential surface of the photosensitive drum 21 in the oppositional region due to a potential difference from a potential of the surface (outer circumferential surface) of the photosensitive drum 21. As a result of this, the electrostatic latent image on the outer circumferential surface of the photosensitive drum 21 is developed by the toner.

Next, a further detailed configuration of the developing device 40 will be described below with reference to FIGS. 4, 5 and 6. It is noted that arrows representing an airflow direction fd in a duct 61 are added in FIGS. 4 and 6.

The developing device 40 includes a toner trapping mechanism 60. The toner trapping mechanism 60 traps toner present in the second conveyance chamber 53. The toner trapping mechanism 60 includes the duct 61, a trapping filter 62, and a fan 63.

The duct 61 is placed in adjacency to the second conveyance chamber 53. The duct 61 is opposed to the photosensitive drum 21 with a placement area of the developing roller 44 in the development container 50 interposed therebetween as viewed in a direction intersecting the longitudinal direction of the development container 50 (left/right lateral direction in FIG. 4, drawing-sheet depthwise direction in FIG. 6). The duct 61 is connected to the second conveyance chamber 53 at an upstream end in the airflow direction. The duct 61 allows air within the second conveyance chamber 53 to be circulated therethrough. The duct 61 has an air inlet port 611 and an air exhaust port 612.

The air inlet port 611, which is a connecting portion of the duct 61 with the second conveyance chamber 53, is placed above the developing roller 44. The air inlet port 611 is positioned at an upstream end of the duct 61 in the airflow direction. The air inlet port 611 is opened over an entire longitudinal length of the second conveyance chamber 53. The air inlet port 611 is formed into, for example, a rectangular shape elongated in the longitudinal direction of the second conveyance chamber 53, and opposed to the developing roller 44. The air inlet port 611 allows interior of the second conveyance chamber 53 and interior of the duct 61 to be communicated with each other. Air in the second conveyance chamber 53 is permitted to flow into the duct 61 through the air inlet port 611.

The air exhaust port 612 is placed, for example, at a back portion of the development container 50. The air exhaust port 612 is placed at a downstream end of the duct 61 in its airflow direction. The air exhaust port 612 permits air present in the duct 61 to flow out. That is, air in the second conveyance chamber 53 is permitted to flow out from within the duct 61 through the air exhaust port 612.

The trapping filter 62 is placed in the duct 61. The trapping filter 62 covers an airflow cross-section of the duct 61. That is, air in the second conveyance chamber 53 that has flowed into the duct 61 through the air inlet port 611 is permitted to pass through the trapping filter 62. As a result of this, the trapping filter 62 traps toner contained in airflows passing through the duct 61.

The fan 63 is connected to the air exhaust port 612 of the duct 61. As the fan 63 is driven (rotated forward), air in the second conveyance chamber 53 is forcedly sucked into the duct 61 and then let to flow outside through the air exhaust port 612. In other words, the fan 63 forcedly sucks air in the second conveyance chamber 53 into the duct 61, letting the air flow outside.

As shown in FIG. 6, an exhaust side of the fan 63 under its forward rotation is connected to a housing duct 2*a* provided in the housing 2 of the image forming apparatus 1. The housing duct 2*a* extends up to an air exhaust part (not shown) provided in exterior of the image forming apparatus 1 and communicated with outside of the image forming apparatus 1. As a result of this, the fan 63 allows the air in the second conveyance chamber 53 to flow outside of the image forming apparatus 1 via the duct 61 and the housing duct 2*a*. Otherwise, the fan 63 may be placed in the exhaust part to which the housing duct 2$a$ is connected so that the exhaust part is communicated with outside of the image forming apparatus 1.

Then, as shown in FIGS. 4 and 5, the development container 50 has an air vent 56 opened in the first conveyance chamber 52. In this embodiment, as an example, the air vent 56 is formed into a rectangular shape extending along the longitudinal direction of the first conveyance chamber 52 and placed at a longitudinal central portion of the first conveyance chamber 52. In addition, the air vent 56 may also be formed over a longitudinal entire length of the first conveyance chamber 52.

The air vent 56 extends inward and outward through a peripheral wall portion of the first conveyance chamber 52. That is, the air vent 56 is communicated with outside of the development container 50. As a result of this, the air vent 56 permits air within the first conveyance chamber 52 to flow outward of the development container 50.

According to the above-described configuration, since air within the first conveyance chamber 52 is permitted to flow outward of the development container 50 through the air vent 56, any pressure increases within the first conveyance chamber 52 can be suppressed. As a consequence, toner present in the stirring region in the developing device 40 can be prevented from flying-and-rising and reaching the toner trapping mechanism 60. That is, trapping of more than necessary quantity of toner by the trapping filter 62 can be suppressed, making it implementable to enhance stability of the toner trapping mechanism 60 in its trapping performance. Consequently, in the developing device 40, it becomes possible to continue the stable trapping of scattered toner.

Also, the air vent 56 is formed at an upper portion of the first conveyance chamber 52. In more detail, the air vent 56 is formed at a ceiling portion of the first conveyance chamber 52 so as to extend in an up/down direction through the peripheral wall portion of the first conveyance chamber 52. That is, since the air vent 56 is opened upward relative to the first conveyance chamber 52, the developer can be prevented from unintentionally leaking downward via the air vent 56.

Also, the development container 50 has a ventilation filter 57 covering the air vent 56. In more detail, the ventilation filter 57 covers an airflow cross section of the air vent 56. That is, air that flows out from within the first conveyance chamber 52 via the air vent 56 outward of the development container 50 passes through the ventilation filter 57. As a result of this, the ventilation filter 57 traps toner contained in the air passing through the air vent 56. Thus, it becomes possible to enhance the effect of preventing toner from leaking via the air vent 56.

In addition, placement of the ventilation filter 57 may be omitted, for example, by providing a ventilation duct which is formed into a cylindrical shape extending continuously upward from the air vent 56.

Figure 7:
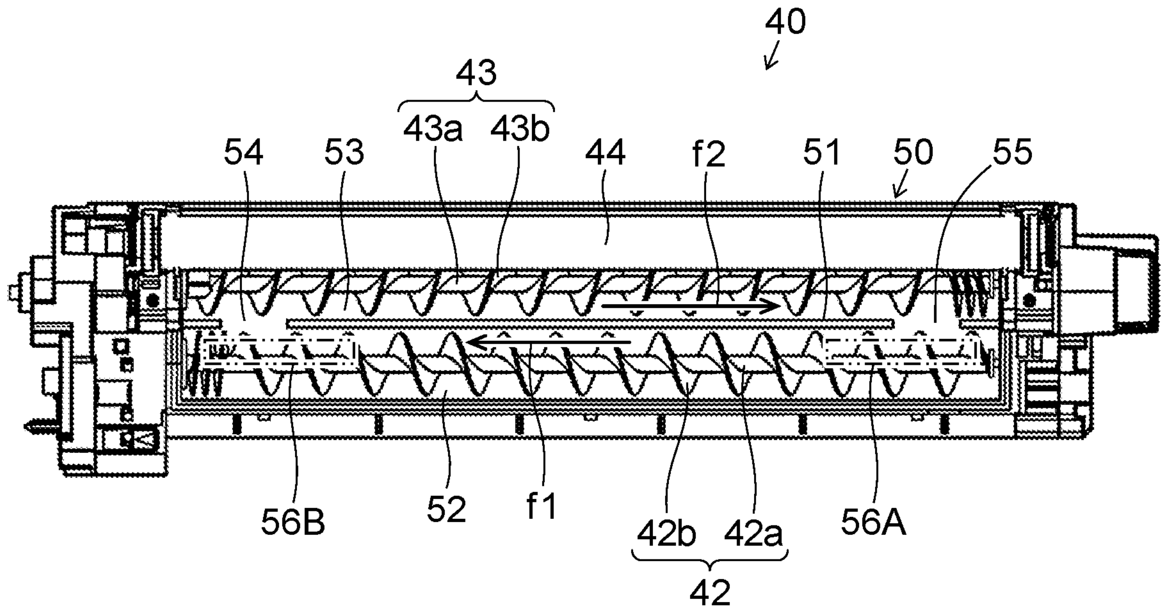
FIG. 7 is a horizontal cross-sectional plan view of a developing device according to Modification Example 1.

FIG. 7 is a horizontal cross-sectional plan view of a developing device 40 according to Modification Example 1. In the developing device 40 of Modification Example 1, the development container 50 has two air vents 56A, 56B. The air vents 56A, 56B are placed at both upstream-and-downstream end portions, respectively, in the developer conveyance direction (first direction f1) of the first conveyance chamber 52. At both upstream-and-downstream end portions of the developer conveyance direction of the first conveyance chamber 52, the first conveyance chamber 52 is communicated with the second conveyance chamber 53, making the first conveyance chamber 52 more easily increasable in pressure. Accordingly, providing the air vents 56A, 56B makes it possible to suppress pressure increases by virtue of outflow of air that is permitted to flow outward via the air vents 56A, 56B at both end portions of the first conveyance chamber 52.

In addition, the air vent may be placed at at least one downstream-side end portion out of upstream-and-downstream both end portions as viewed in the developer conveyance direction (first direction f1) of the first conveyance chamber 52. As a result of this, with regard to the first conveyance chamber 52, air can be let to flow outward via the air vent 56B at the downstream-side end portion of the first conveyance chamber 52, at which in particular pressure increases are more likely to occur. Accordingly, pressure increases within the first conveyance chamber 52 can be suppressed.

Figure 8:
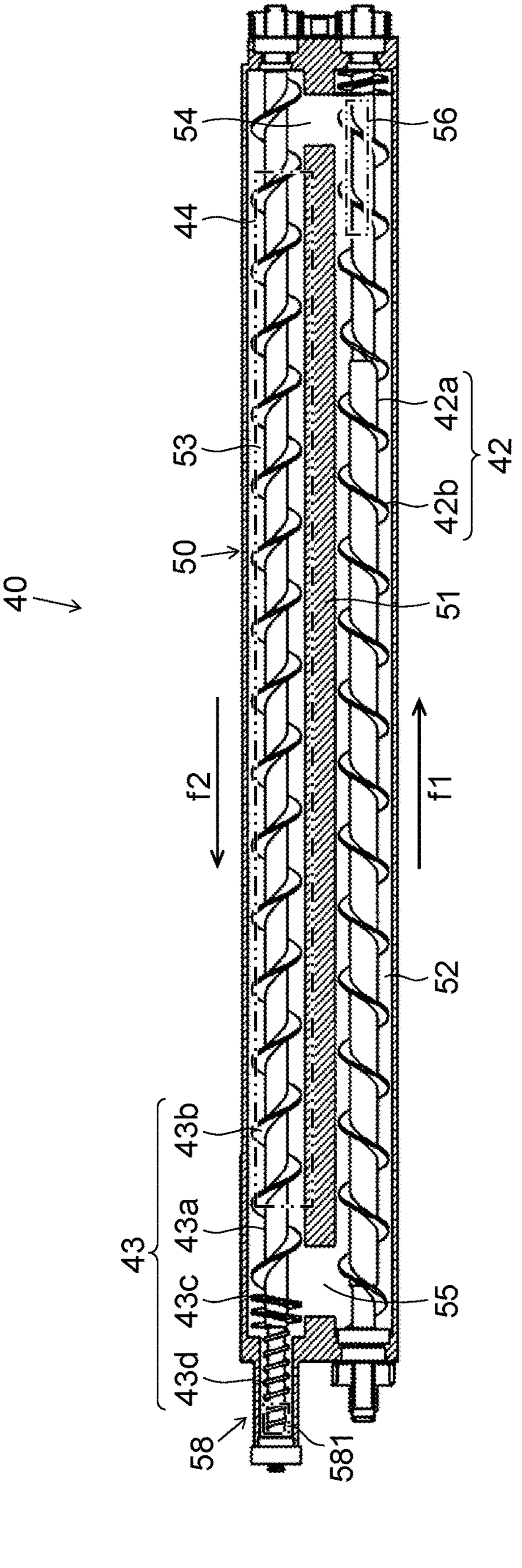
FIG. 8 is a horizontal cross-sectional plan view of a developing device according to Modification Example 2.
Figure 9:
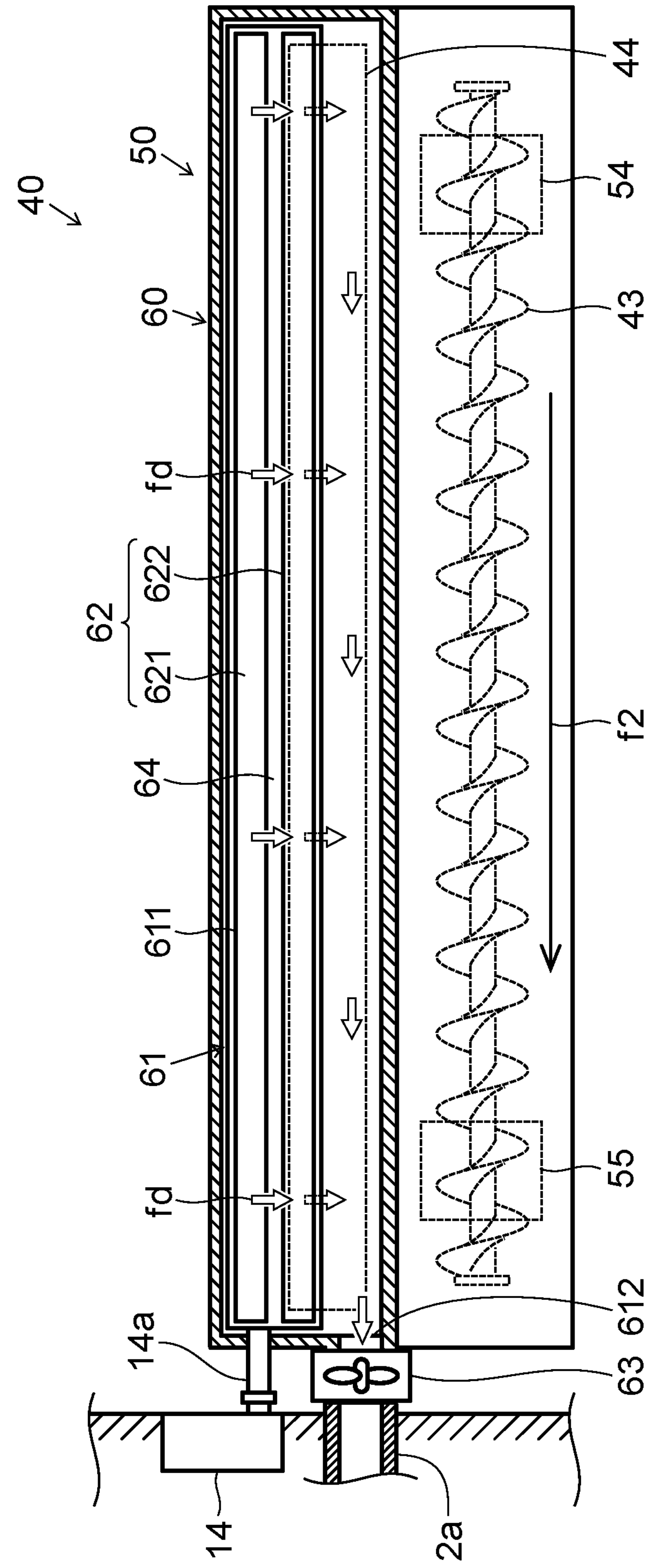
FIG. 9 is a vertical cross-sectional side view of the developing device according to Modification Example 2.

FIGS. 8 and 9 are a horizontal cross-sectional plan view and a vertical cross-sectional side view, respectively, of the developing device 40 according to Modification Example 2. In the developing device 40 of Modification Example 2, the development container 50 includes a discharge part 58. The discharge part 58 is provided further downstream of the downstream end of the second conveyance chamber 53 in the second direction f2. The discharge part 58 connects to the second conveyance chamber 53. Interior of the discharge part 58 and the interior of the second conveyance chamber 53 are communicated with each other. The discharge part 58 is smaller in inner diameter than the second conveyance chamber 53. The discharge part 58 has a developer discharge port 581.

In addition, the rotating shaft 43$a$ of the second conveyance member 43 extends continuously to within the discharge part 58. One axial end of the rotating shaft 43$a$ is rotatably supported by the development container 50 at a downstream end of the discharge part 58 as viewed in the second direction f2 of the second conveyance chamber 53.

The developer discharge port 581 is placed at a downstream end of the discharge part 58 as viewed in the second direction f2 of the second conveyance chamber 53. For example, the developer discharge port 581 is opened under the rotating shaft 43$a$ of the second conveyance member 43. The developer discharge port 581 allows excess developer within the development container 50 to be discharged outside.

The second conveyance member 43 further includes restricting vanes 43$c$ and discharge vanes 43$d$ in addition to the second conveyance vanes 43$b$. These three kinds of vanes are provided in an order of the second conveyance vanes 43$b$, the restricting vanes 43$c$ and the discharge vanes 43$d$ as mentioned from the second conveyance chamber 53 side toward the discharge part 58. The restricting vanes 43$c$ and the discharge vanes 43$d$ are provided integrally with the rotating shaft 43$a$, like the second conveyance vanes 43$b$, so as to extend helically along the axial direction of the rotating shaft 43$a$ in its outer circumferential portion.

The restricting vanes 43$c$ are positioned downstream of the second conveyance vanes 43$b$ as viewed in the second direction f2 of the second conveyance chamber 53, and placed within the second conveyance chamber 53. The restricting vanes 43$c$ are opposed to a connecting portion between the second conveyance chamber 53 and the discharge part 58 in the axial direction of the rotating shaft 43$a$.

The restricting vanes 43$c$ are inverse to the second conveyance vanes 43$b$ in terms of winding direction. As a result of this, the restricting vanes 43$c$ block the developer that has been conveyed to near the downstream end within the second conveyance chamber 53, so that movement of the developer to the discharge part 58 side is restricted. It is noted that the restricting vanes 43*c* are smaller in pitch than the second conveyance vanes 43*b*.

An outer circumferential portion of the restricting vanes 43*c* has a specified clearance against an inner surface of the development container 50. Developer having exceeded a specified quantity in the second conveyance chamber 53 is conveyed, as excess developer, through the clearance between the outer circumferential portion of the restricting vanes 43*c* and the inner surface of the development container 50 toward the discharge part 58.

The discharge vanes 43*d* are positioned downstream of the restricting vanes 43*c* as viewed in the second direction f2 of the second conveyance chamber 53, and placed within the discharge part 58. The discharge vanes 43*d* are identical in winding direction to the second conveyance vanes 43*b*. That is, the developer conveyance direction in the discharge part 58 is identical to the second direction f2 of the second conveyance chamber 53. As a result of this, the discharge vanes 43*d* convey excess developer in the discharge part 58 toward the developer discharge port 581. It is noted that an outer diameter of the discharge vanes 43*d* is smaller than outer diameters of the second conveyance vanes 43*b* and the restricting vanes 43*c*. A pitch of the discharge vanes 43*d* is smaller than a pitch of the second conveyance vanes 43*b*.

The development container 50 has the air vent 56. The air vent 56 is placed at a downstream-side end portion of the first conveyance chamber 52 as viewed in its developer conveyance direction (first direction f1). Moreover, the air vent 56 is placed at an opposite-side end portion of the first conveyance chamber 52 in its developer conveyance direction, which is opposite to the side on which the developer discharge port 581 is placed.

According to the above-described configuration, outflow of air present within the development container 50 through the developer discharge port 581 can be expected on the upstream side of the first conveyance chamber 52 in its developer conveyance direction. That is, the developer discharge port 581 can be made to act for suppression of pressure increases. Furthermore, providing the air vent 56 also on the downstream side of the first conveyance chamber 52 in its developer conveyance direction contributes to suppressing pressure increases within the first conveyance chamber 52.

Developer to be used for formation of toner images in the image forming apparatus 1 is a two-component developer containing magnetic carrier and toner. With a two-component developer, it is known that toner scattering from the development container 50 is more likely to occur. Therefore, in the image forming apparatus 1 with the use of a two-component developer, providing the air vent 56 as described above makes it possible to even more effectively suppress toner scattering in the image forming apparatus 1.

Reverting to FIG. 4, the trapping filter 62 includes a first trapping filter 621 and a second trapping filter 622. The first trapping filter 621 and the second trapping filter 622 are both retained by a single retaining member 64. The retaining member 64 is placed at an airflow-direction upstream portion in the duct 61 so as to be adjacent to the air inlet port 611.

The first trapping filter 621 is placed at a site of the air inlet port 611, which is a connecting portion between the duct 61 and the second conveyance chamber 53. The first trapping filter 621, identical in shape to the air inlet port 611, is formed into, for example, a rectangular shape elongated in the longitudinal direction of the second conveyance chamber 53. The first trapping filter 621 covers the air inlet port 611. That is, the first trapping filter 621 is opposed to the developing roller 44. The first trapping filter 621 traps toner contained in air that flows from the second conveyance chamber 53 into the duct 61.

The second trapping filter 622 is placed on a downstream side of the first trapping filter 621 as viewed in the airflow direction in the duct 61. The second trapping filter 622, which is identical in shape to a cross section in a direction intersecting the airflow direction in the duct 61, is formed into, for example, a rectangular shape elongated in the longitudinal direction of the second conveyance chamber 53. The second trapping filter 622 covers the airflow cross-section in the duct 61. The second trapping filter 622 traps toner contained in the air passing through the first trapping filter 621 and flowing within the duct 61.

The first trapping filter 621 is a nonwoven fabric which is made from, for example, circular-in-cross-section fabric having an outer diameter of 10 to 20 μm and which has a thickness of about 1 mm. The second trapping filter 622 is a nonwoven fabric which is made from, for example, circular-in-cross-section fabric having an outer diameter of 20 to 40 μm and which has a thickness of about 0.2 mm. The second trapping filter 622 is enhanced in toner trapping efficiency by virtue of its being made finer in mesh roughness than the first trapping filter 621.

According to the makeup of the trapping filter 62, the first trapping filter 621 can be kept from large-quantity trapping of scattered toner present in the second conveyance chamber 53 (around the developing roller 44), thus being made less likely to be clogged. Further, the second trapping filter 622 makes it possible to prevent leakage of toner outside of the development container 50. Furthermore, setting the first trapping filter 621 larger in opening area than the second trapping filter 622 makes it implementable to uniformize sucking force by the fan 63 at the site of the first trapping filter 621.

As shown in FIGS. 2, 6 and 9, the image forming apparatus 1 further includes a vibration generating part 14. The vibration generating part 14 is set on the housing 2 of the image forming apparatus 1.

The vibration generating part 14 is placed in opposition to the development container 50 outside the developing device 40. The vibration generating part 14 includes, for example, a vibrating motor, a control board, as well as other electronic circuits and electronic components (none shown). On an output shaft of the vibrating motor, attached is an exciting weight whose center of gravity is eccentric to a rotational axis of the output shaft of the vibrating motor.

The vibration generating part 14 is connected to the retaining member 64 via a connecting member 14*a*. As the vibrating motor is driven, the vibration generating part 14 makes the trapping filter 62 vibrated via the retaining member 64. In other words, vibrations are imparted to the trapping filter 62 by the vibration generating part 14.

By the first trapping filter 621 being vibrated by the vibration generating part 14, toner trapped by the first trapping filter 621 and deposited on the first trapping filter 621 can be dropped into the second conveyance chamber 53. Therefore, functions of the first trapping filter 621 can be recovered, making it possible to continuously suppress toner scattering in the image forming apparatus 1. It is to be noted that toner dropped from the first trapping filter 621 due to vibrations would be deposited on the magnetic brush formed on the outer circumferential surface of the developing roller 44.

Alternatively, the vibration generating part 14 may be provided in the developing device 40. In that case, preferably, size and output of the vibrating motor are adjusted, as the case may be, in accordance with a placement site of the vibration generating part 14.

Now, evaluation of toner scattering in the image forming apparatus 1 will be described below. In this evaluation, printing with images at a print coverage rate of 5% per sheet S was carried out in a total of 5,000 sheets on a basis of 1,000 sheets for each of one-sheet intermittence (one-second halt after every one-sheet printing), five-sheet intermittence (one-second halt after every five-sheet printing; ditto for the followings), ten-sheet intermittence, twenty-sheet intermittence, and continuous printing. Each time 5,000 sheets were printed, the toner collection mode was executed. Then, printing in the same manner was carried out up to 100,000 sheets, and toner scattering onto the top surface of the development container 50 was checked.

In execution of intermittent printing, there is a need for driving the developing device 40 during a certain stabilization period (e.g., 5 sec) before and after printing in order to obtain system stabilization. In cases of smaller-number-of-sheets intermittent printing such as one-sheet intermittence and five-sheet intermittence, when an identical number of sheets (e.g., 1,000 sheets) are printed, the number of times of the stabilization period increases (1,000 times for one-sheet intermittence, 200 times for five-sheet intermittence), hence a fear for generation of larger quantities of toner scattering. For this reason, system speed is set lower than normal in smaller-number-of-sheets intermittent printing. Since toner scattering decreases more and more with lowering system speed, generation of toner scattering can be suppressed in smaller-number-of-sheets intermittent printing such as one-sheet intermittence and five-sheet intermittence. In particular, in the case of one-sheet intermittence, further lowering the system speed than in the case of five-sheet intermittence allows the generation of toner scattering to be suppressed to more extent.

The image forming apparatus 1 used in this evaluation is that of Modification Example 2 described above with reference to FIGS. 8 and 9. That is, the development container 50 of the image forming apparatus 1 in this Example includes the air vent 56 and the discharge part 58. In contrast to this, the image forming apparatus of Comparative Example has no air vent provided in the development container.

Then, as to the evaluation of toner scattering, first evaluation and second evaluation differing in rotational conditions for the developing roller from each other were carried out.

In connection with the first evaluation, evaluation conditions and evaluation results of Example 1 are shown in Table 1, while evaluation conditions and evaluation results of Comparative Example 1 are shown in Table 2.

TABLE 1

| EXAMPLE 1 | UNDER VIBRATIONS | | UNDER TONER COLLECTION |
|---|---|---|---|
| VIBRATION GENERATING PART | ON | | OFF |
| DEVELOPING ROLLER | HALT | | REVERSE ROTATION |
| FAN | FILTER RECOVERABILITY | TONER SCATTERING | TONER SCATTERING |
| SUCTION | SLIGHTLY FAULTY | NO | SLIGHT |
| HALT | SUCCESSFUL | SLIGHT | PARTIAL |
| DISCHARGE | VERY SUCCESSFUL | PARTIAL | PARTIAL |

TABLE 2

| COMPARATIVE EXAMPLE 1 | UNDER VIBRATIONS | | UNDER TONER COLLECTION |
|---|---|---|---|
| VIBRATION GENERATING PART | ON | | OFF |
| DEVELOPING ROLLER | HALT | | REVERSE ROTATION |
| FAN | FILTER RECOVERABILITY | TONER SCATTERING | TONER SCATTERING |
| SUCTION | SLIGHTLY FAULTY | SLIGHT | LARGE-QUANTITY |
| HALT | SUCCESSFUL | PARTIAL | VERY LARGE-QUANTITY |
| DISCHARGE | VERY SUCCESSFUL | PARTIAL | VERY LARGE-QUANTITY |

The developing roller 44 was set to a halt of rotation under a state of 'vibrations' with the vibration generating part 14 held drive-on, and the developing roller 44 was set to reverse rotation (clockwise in FIG. 4) under a state of 'toner collection' with the vibration generating part 14 held drive-off. Toner trapped by the trapping filter 62 is dropped onto the magnetic brush formed on the outer circumferential surface of the developing roller 44 under a state of 'vibrations'. Further, under a state of 'toner collection', the developing roller 44, to which the developing voltage is applied, is set to reverse rotation, the dropped toner is collected via the photosensitive drum 21 in the drum cleaning part 23.

Then, in each case of 'under vibrations' and 'under toner collection', the fan 63 of the toner trapping mechanism 60 was driven under conditions of 'suction', 'halt' and 'discharge'. Under 'suction', the fan 63 is rotated forward so that air within the second conveyance chamber 53 is sucked into the duct 61. For this reason, the recoverability of the trapping filter 62 is slightly faulty. Under 'halt', rotation of the fan 63 is halted. For this reason, the recoverability of the trapping filter 62 is successful. Under 'discharge', making the fan 63 rotated reverse allows toner trapped by the trapping filter 62 to be discharged from within the duct 61 to the second conveyance chamber 53 side. For this reason, the recoverability of the trapping filter 62 is very successful.

According to Table 2, with the image forming apparatus of Comparative Example 1, under 'vibrations', suction of the fan, when executed, led to slight quantity of toner scattering onto the top surface of the development container. On the other hand, in the cases with the fan under halt and under discharge, toner scattering occurred on part of the top surface of the development container. Furthermore, under 'toner collection', suction of the fan, when executed, led to large-quantity of toner scattering occurrence, and halt and discharge of the fan, when executed, led to very large-quantity of toner scattering occurrence.

In contrast to this, according to Table 1, with the image forming apparatus 1 of Example 1 of the present disclosure, when the fan 63 was set to 'discharge' under 'vibrations', toner scattering occurred in part of the top surface of the development container 50, yet toner scattering became slight with the fan 63 set to halt, and no toner scattering occurred with the fan 63 set to suction. Further, under toner collection, with the fan 63 set to halt and discharge, toner scattering occurred on part of the top surface of the development container 50, while with the fan 63 set to suction, slight quantity of toner scattering occurred.

In connection with the second evaluation, evaluation conditions and evaluation results of Example 2 are shown in Table 3, and evaluation conditions and evaluation results of Comparative Example 2 are shown in Table 4.

TABLE 3

| EXAMPLE 2 | UNDER VIBRATIONS | | UNDER TONER COLLECTION |
|---|---|---|---|
| VIBRATION GENERATING PART | ON | | OFF |
| DEVELOPING ROLLER | FORWARD ROTATION | | |
| FAN | FILTER RECOVERABILITY | TONER SCATTERING | TONER SCATTERING |
| SUCTION | SLIGHTLY FAULTY | SLIGHT | NO |
| HALT | SUCCESSFUL | PARTIAL | SLIGHT |
| DISCHARGE | VERY SUCCESSFUL | PARTIAL | PARTIAL |

TABLE 4

| COMPARATIVE EXAMPLE 2 | UNDER VIBRATIONS | | UNDER TONER COLLECTION |
|---|---|---|---|
| VIBRATION GENERATING PART | ON | | OFF |
| DEVELOPING ROLLER | FORWARD ROTATION | | |
| FAN | FILTER RECOVERABILITY | TONER SCATTERING | TONER SCATTERING |
| SUCTION | SLIGHTLY FAULTY | LARGE-QUANTITY | PARTIAL |
| HALT | SUCCESSFUL | LARGE-QUANTITY | LARGE-QUANTITY |
| DISCHARGE | VERY SUCCESSFUL | VERY LARGE-QUANTITY | LARGE-QUANTITY |

The developing roller 44 was set to forward rotation (counterclockwise in FIG. 4) under a state of 'vibrations' with the vibration generating part 14 held drive-on, and the developing roller 44 was set to continue forward rotation as it was under a state of 'toner collection' with the vibration generating part 14 held drive-off. Toner trapped by the trapping filter 62 is dropped onto the magnetic brush formed on the outer circumferential surface of the developing roller 44 under a state of 'vibrations'. Further, under a state of 'toner collection', the developing roller 44, to which the developing voltage is applied, is set to forward rotation, and the dropped toner is collected to lower portion within the second conveyance chamber 53 and reused.

Drive conditions for the fan 63 of the toner trapping mechanism 60 are the same as in the foregoing first evaluation.

According to Table 4, with the image forming apparatus of Comparative Example 2, under 'vibrations', suction and halt of the fan, when executed, led to occurrence of large-quantity toner scattering onto the top surface of the development container, and discharge of the fan, when executed, led to occurrence of very large-quantity toner scattering. Further, under 'toner collection', suction of the fan, when executed, led to occurrence of toner scattering on part of the top surface of the development container, and halt and discharge of the fan, when executed, led to occurrence of large-quantity toner scattering.

In contrast to this, according to Table 3, with the image forming apparatus 1 of Example 2 of the present disclosure, under 'vibrations', when the fan 63 was set to 'halt' and 'discharge', toner scattering occurred in part of the top surface of the development container 50, but toner scattering became slight with the fan 63 set to suction. Further, under 'toner collection', toner scattering occurred in part of the top surface of the development container 50 with the fan 63 set to discharge, but toner scattering became slight with the fan 63 set to halt, and no toner scattering occurred with the fan 63 set to suction.

As described above, according to the configuration of this embodiment, it can be considered that suppression of pressure increases within the first conveyance chamber 52 has been realized effectively, trapping of more than necessary quantity of toner by the trapping filter 62 has been suppressed, and thus trapping-performance stability of the toner trapping mechanism 60 has been improved. As a result of this, it can be concluded that toner scattering onto the top surface of the development container 50 has been suppressed.

Figure 10:
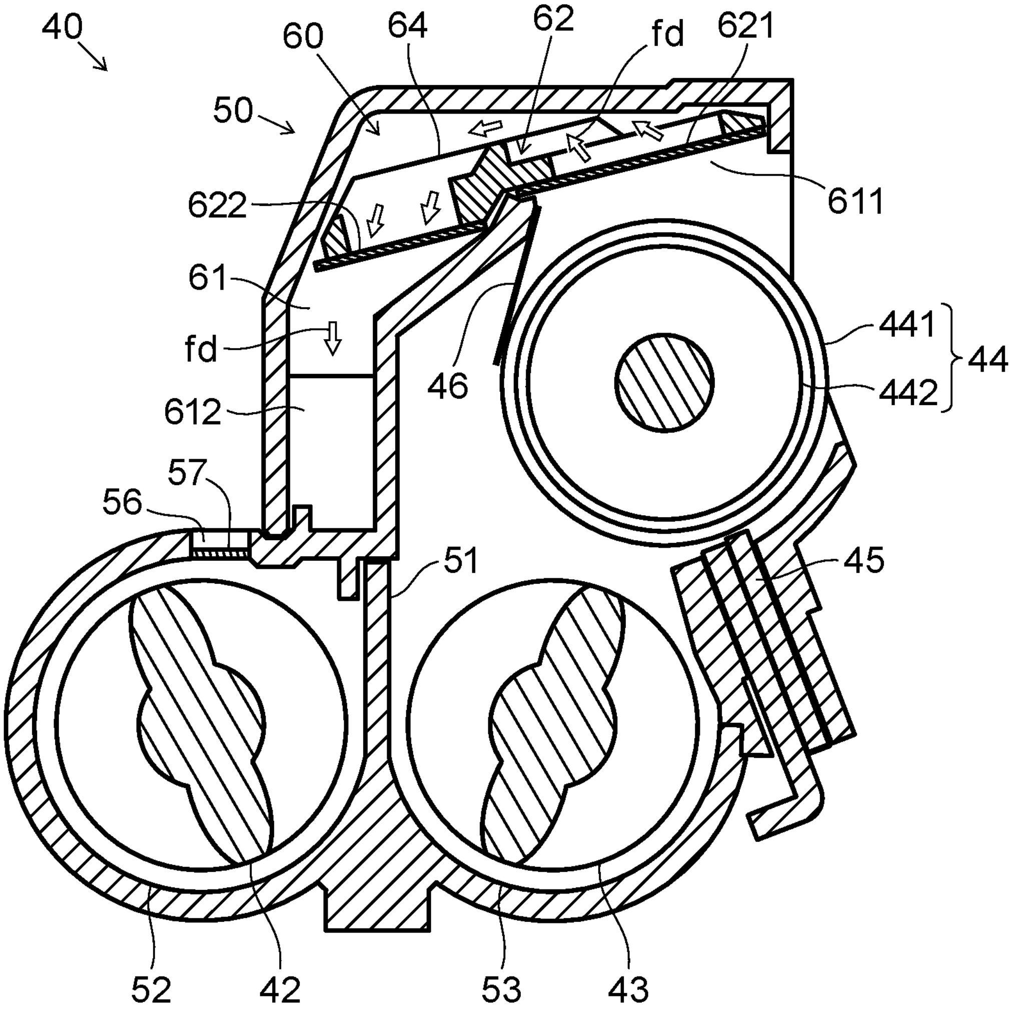
FIG. 10 is a vertical cross-sectional front view of a developing device according to Modification Example 3.

FIG. 10 is a vertical cross-sectional front view of the developing device 40 according to Modification Example 3. The developing device 40 of Modification Example 3 includes a film member 46.

The film member 46 is set onto an inner wall of the development container 50 in proximity to the air inlet port 611 of the toner trapping mechanism 60. In more detail, the film member 46 is mounted on an inner wall of the development container 50 downstream of the air inlet port 611 as viewed in a rotational direction (forward rotation, counterclockwise in FIG. 10) of the developing roller 44 during image formation. The film member 46 extends over an entire length of the developing roller 44 in its axial direction. The film member 46 extends toward the developing roller 44.

Then, the film member 46 is placed in contacting opposition to the outer circumferential surface of the developing roller 44. In more detail, out of an elongation-forward end portion of the film member 46 as elongated from its mounting site, a planar portion of the film member 46 is put into contact with the outer circumferential surface of the developing roller 44.

Next, in terms of presence or absence of the film member 46, evaluation of toner scattering inside the image forming apparatus 1 is described below. It is to be noted that various conditions in this evaluation are the same as those described with reference to Tables 1, 2, 3 and 4 and therefore description thereof is omitted here. In addition, drive conditions for the fan 63 of the toner trapping mechanism 60 were assumed as the only case of 'suction'.

The image forming apparatus 1 of Example 1 used in this evaluation is that described above with reference to Table 1. The developing device 40 of Example 1 includes no film member 46. By contrast, the image forming apparatus 1 of Example 3 includes the film member 46 shown in FIG. 10. Evaluation conditions and evaluation results are shown in Table 5.

TABLE 5

| | UNDER VIBRATIONS | | UNDER TONER COLLECTION |
|---|---|---|---|
| VIBRATION GENERATING PART | ON | | OFF |
| DEVELOPING ROLLER | HALT | | REVERSE ROTATION |
| | FILTER RECOVERABILITY | TONER SCATTERING | TONER SCATTERING |
| EXAMPLE 1 | SLIGHTLY FAULTY | NO | SLIGHT |
| EXAMPLE 3 | SLIGHTLY FAULTY | NO | NO |

According to Table 5, with the image forming apparatus 1 of Example 1 of the present disclosure, there occurred no toner scattering onto the top surface of the development container 50 'under vibrations', and slight toner scattering occurred 'under toner collection'. By contrast, with the image forming apparatus 1 of Example 3 of the present disclosure, there occurred no toner scattering onto the top surface of the development container 'under vibrations', neither toner scattering occurred also 'under toner collection'.

As described above, according to the configuration of Example 3, by virtue of the film member 46 being included therein, toner present in developer-stirring regions in which the first conveyance member 42 and the second conveyance member 43 are placed can be made less likely to reach the toner trapping mechanism 60 with an enhanced effect. That is, the suppressing effect for the occurrence that more than necessary quantity of toner is trapped by the trapping filter 62 can be enhanced, so that the stability in trapping performance of the toner trapping mechanism 60 can be enhanced to even more extent. Thus, as ascertained by the above results, it becomes implementable to suppress toner scattering onto the top surface of the development container 50.

Although an embodiment of the present disclosure has been described hereinabove, yet the scope of the disclosure is not limited to this, and the disclosure may be changed and modified in various ways unless those changes and modifications depart from the gist of the disclosure.

For example, in the above-described embodiment, the image forming apparatus 1 is assumed as being a tandem-type image forming apparatus for color printing in which images of plural colors are formed in successive superimposition on one another. However, the image forming apparatus is not limited to such models. The image forming apparatus may be a non-tandem-type image forming apparatus for color printing or an image forming apparatus for monochrome printing.

What is claimed is:

1. A developing device comprising:

a development container including a first conveyance chamber and a second conveyance chamber placed in parallel juxtaposition and a first communicating portion and a second communicating portion through which the first and second conveyance chambers communicate with each other at their longitudinal both end portions, the development container containing a toner-containing developer to be fed to an image carrier;

a first conveyance member and a second conveyance member which are rotatably supported by the first conveyance chamber and the second conveyance chamber, respectively, and which convey and circulate the developer, while stirring the developer, in mutually opposite directions of the longitudinal direction;

a developer carrier which is rotatably supported by the development container in opposition to the image carrier, and which feeds the toner contained in the second conveyance chamber to the image carrier; and a toner trapping mechanism for trapping the toner contained in the second conveyance chamber, wherein the toner trapping mechanism includes:

a duct which is connected to the second conveyance chamber and which allows air present in the second conveyance chamber to flow therethrough;

an air inlet port which is opened at a connecting portion between the duct and the second conveyance chamber and which allows air present in the second conveyance chamber to flow into the duct;

a trapping filter which traps the toner contained in air flowing through the duct; and a fan which allows air present in the second conveyance chamber to be sucked into the duct and let to flow outside, the developer is a two-component developer containing magnetic carrier and the toner, the development container has:

an air vent disposed at a location different from the first and second communicating portions, the air vent being opened in a circumferential wall part of the first conveyance chamber from inside to outside the air vent being communicated with outside of the development container; and a developer discharge port which is formed at a downstream-side end portion of the second conveyance chamber as viewed in a developer conveyance direction of the second conveyance chamber and which allows excess portion of the developer present within the development container to be discharged outside, and the air vent is placed on a downstream-side end portion of the first conveyance chamber in its developer conveyance direction, the downstream-side end portion being opposite to a side on which the developer discharge port is placed.

2. The developing device according to claim 1, wherein the air vent is formed at an upper portion of the first conveyance chamber.

3. The developing device according to claim 1, wherein the development container includes a ventilation filter which covers the air vent.

4. The developing device according to claim 1, wherein the air vent is placed at at least a downstream-side end portion out of both upstream- and downstream-side end portions of the first conveyance chamber as viewed in a developer conveyance direction of the first conveyance chamber.

5. The developing device according to claim 1, wherein the trapping filter includes:

a first trapping filter which covers the air inlet port; and a second trapping filter which is placed downstream of the first trapping filter in the duct, as viewed in an airflow direction of the duct, to cover an airflow cross section and which is higher in toner-trapping efficiency than the first trapping filter.

6. The developing device according to claim 1, further comprising a film member which is attached to an inner-wall portion of the development container downstream of the air inlet port as viewed in a rotational direction of the developer carrier during image formation, the film member extending toward the developer carrier so as to be placed in contacting opposition to an outer circumferential surface of the developer carrier, and in an elongation-forward end portion of the film member as elongated from its mounting site, a planar portion of the film member makes contact with the outer circumferential surface of the developer carrier.

7. An image forming apparatus including the developing device according to claim 1.

8. The image forming apparatus according to claim 7, further comprising a vibration generating part including a vibrating motor and an exciting weight attached on an output shaft of the vibrating motor, the vibration generating part vibrating the trapping filter.

* * * * *